Aug. 12, 1969     R. J. BENSON     3,460,852
SUSPENSION SYSTEM

Original Filed Jan. 14, 1966     5 Sheets-Sheet 1

INVENTOR
R. J. BENSON
By John Maier, III
ATTORNEY

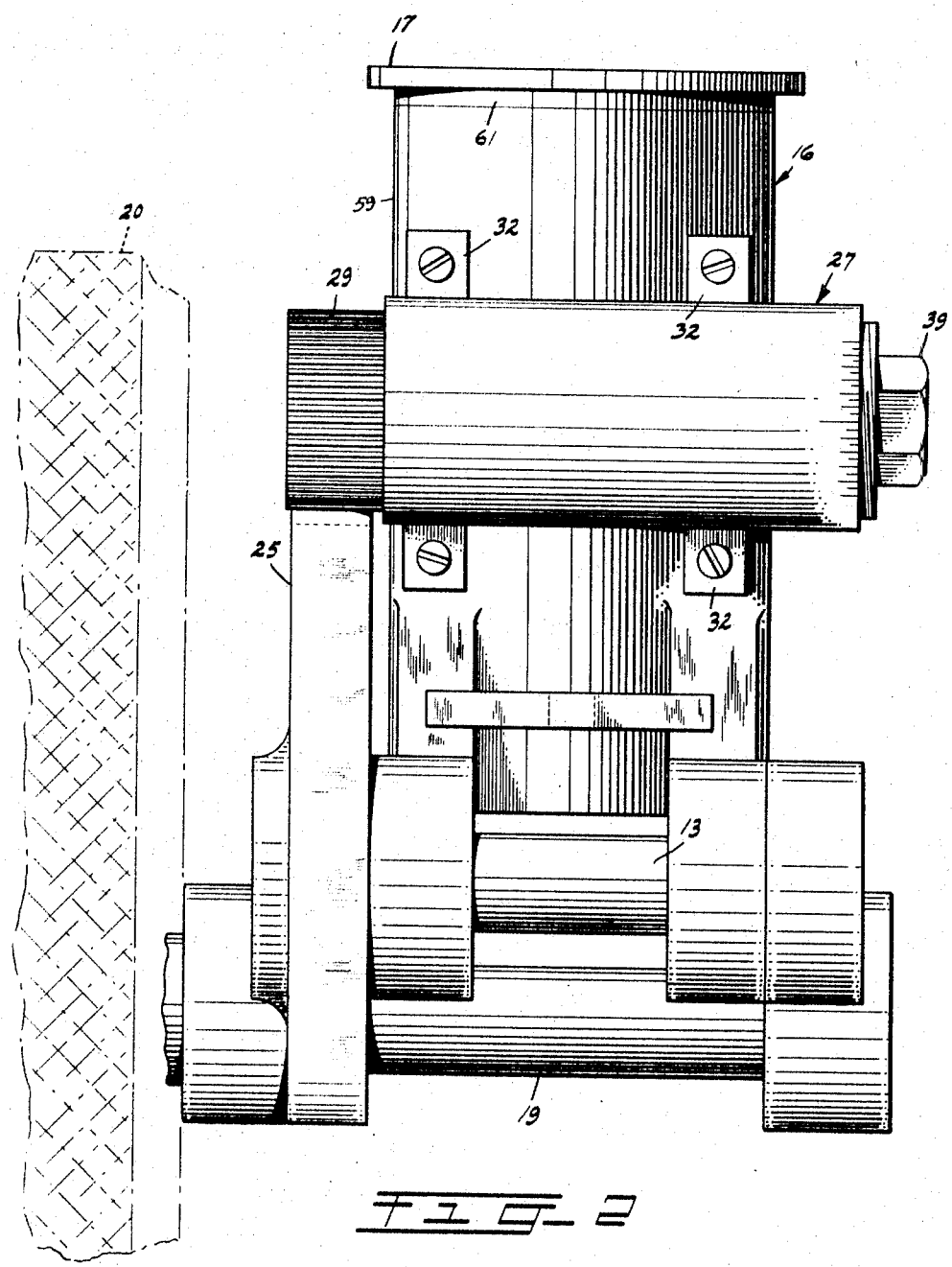

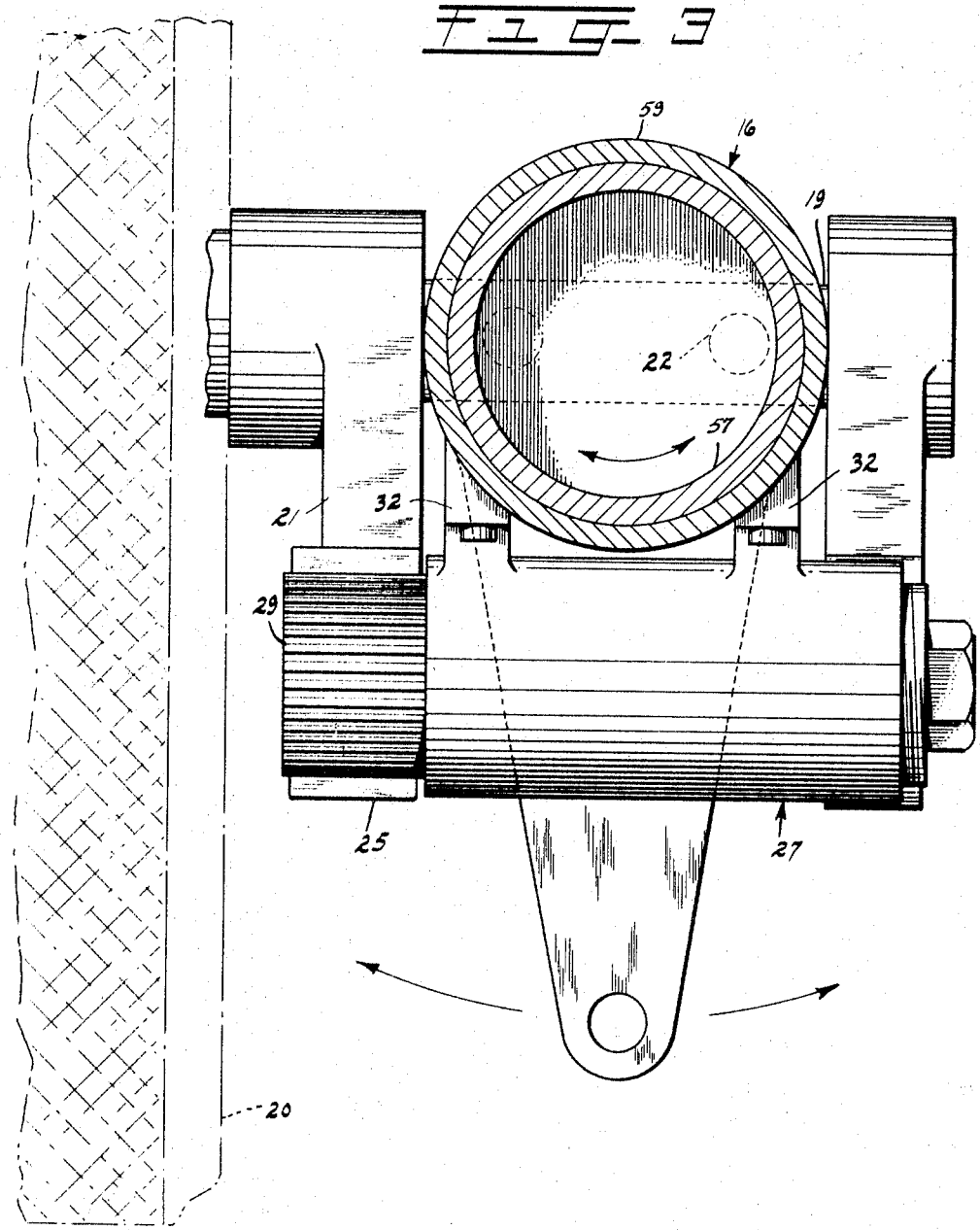

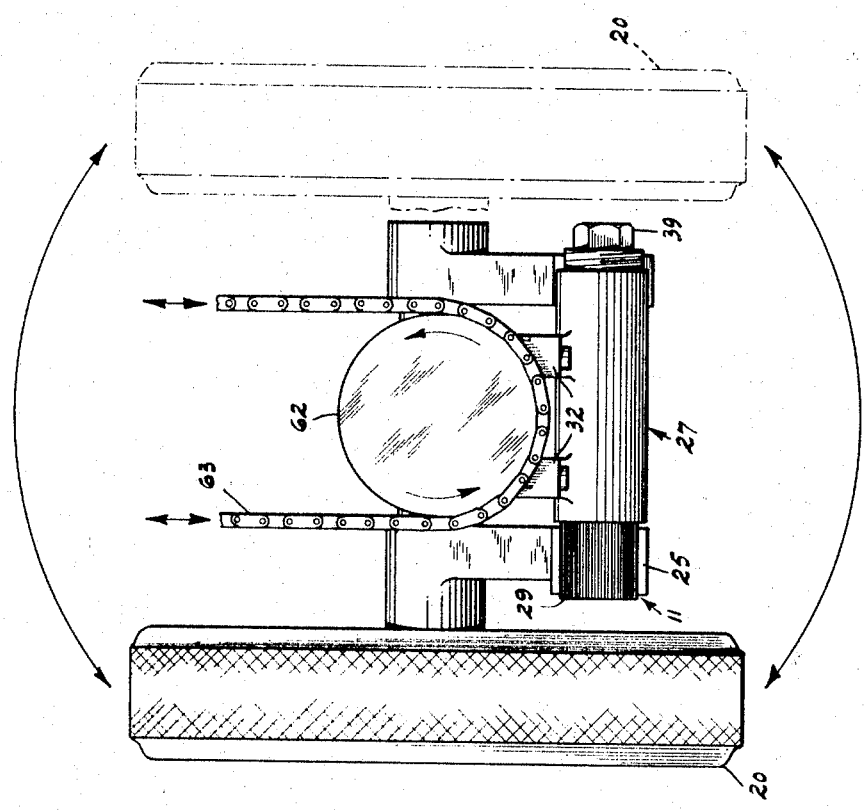

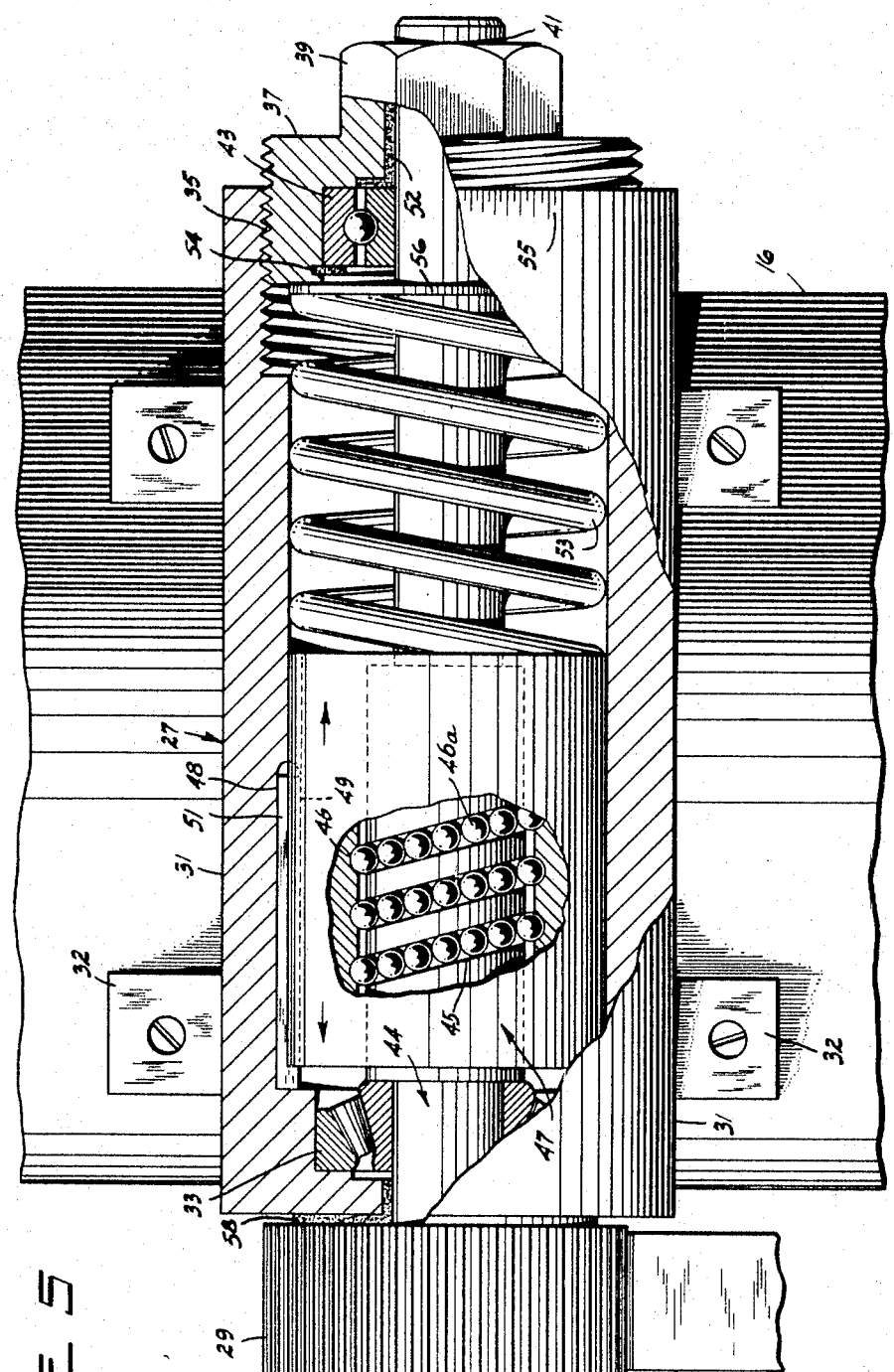

United States Patent Office 3,460,852
Patented Aug. 12, 1969

3,460,852
SUSPENSION SYSTEM
Richard J. Benson, 620 W. Main St.,
Rockaway, N.J. 07866
Continuation of application Ser. No. 520,624, Jan. 14, 1966. This application Oct. 11, 1967, Ser. No. 682,703
Int. Cl. B60g 5/00, 9/00, 11/14
U.S. Cl. 280—124                              15 Claims

ABSTRACT OF THE DISCLOSURE

A suspension system including a spring assembly which receives wheel movement as rotational movement of a shaft, said shaft having a nut mounted thereon whose linear movement is resisted by a resilient means.

Cross-references

This application is a continuation of co-pending application, Ser. No. 520,624, filed Jan. 14, 1966, now abandoned.

Background

In the construction of vehicles such as trucks and automobiles, various types of suspension systems are utilized. The currently available suspension systems have numerous disadvantages. For example, a primary disadvantage of an automobile is that under a heavy load, the suspension system depresses to its top limit leaving no resiliency. Thus, when the vehicle strikes a bump or other irregularity in the surface beneath it, a jolt occurs. Trucks which are constructed to carry heavy loads overcome the above problem by utilizing a suspension system which depresses only when a heavy load is applied. When such a truck operates without a load, the firmness of its suspension system again results in a hard or bumpy ride. Accordingly, a need exists for a vehicle suspension system which can be readily altered as the load conditions change in order to provide the optimum suspension conditions.

Some suspension systems currently in use cause the vehicle's wheels to tip as the load increases resulting in excessive tire wear. The currently available suspension systems are also notably complex and space consuming and require extensive labor for spring replacement. In addition, the system moves with the wheel creating complex problems in equipping the vehicle with such items as brake connections and ball joint articulated steering apparatus.

In currently available suspension systems, where steering is required, the mounting of the steering wheels prevents their completely pivoting. A vehicle so equipped obviously cmannot be moved in as unlimited a number of positions as a vehicle whose wheels can be pivoted a complete revolution. This is particularly true with special application vehicles where all wheels must be steerable.

Objects

Accordingly, it is an object of this invention to provide an improved resilient suspension system for a vehicle.

Another object of this invention is to provide a compact resilient suspension system for a vehicle.

Another object is to provide a resilient suspension system which can be adjusted according to the load being applied.

Another object is to provide a wheel suspension system which retains the wheel in any given plane.

Another object is to provide a wheel suspension system which permits a constant spacing between the vehicle and the steering mechanism.

Another object is to provide a wheel suspension system which permits steering of the wheel about a complete revolution.

Summary

A rotatable shaft is mounted on a vehicle. A means is provided to transfer motion of the wheel relative to the vehicle to rotating motion of the shaft. A nut is mounted on the shaft and is prevented from rotating with the shaft but is permitted to travel linearly as the shaft rotates. A resilient means is loaded to resist the linear travel of the nut and means are provided to adjust the load of the resilient means.

Brief description of the drawings

A better understanding of the invention and its advantages can be had by referring to the drawings in which:

FIGURE 2 is a front elevation of the vehicle suspension system shown in FIGURE 1.

FIGURE 3 is a plan view of the vehicle suspension system shown in FIGURE 1.

FIGURE 4 is a plan view similar to FIGURE 3 but showing the wheel system with a steering arrangement.

FIGURE 5 is an enlarged fragmentary view showing the interior design of the spring assembly utilized in accordance with this invention.

Description of the preferred embodiments

Figure 1:
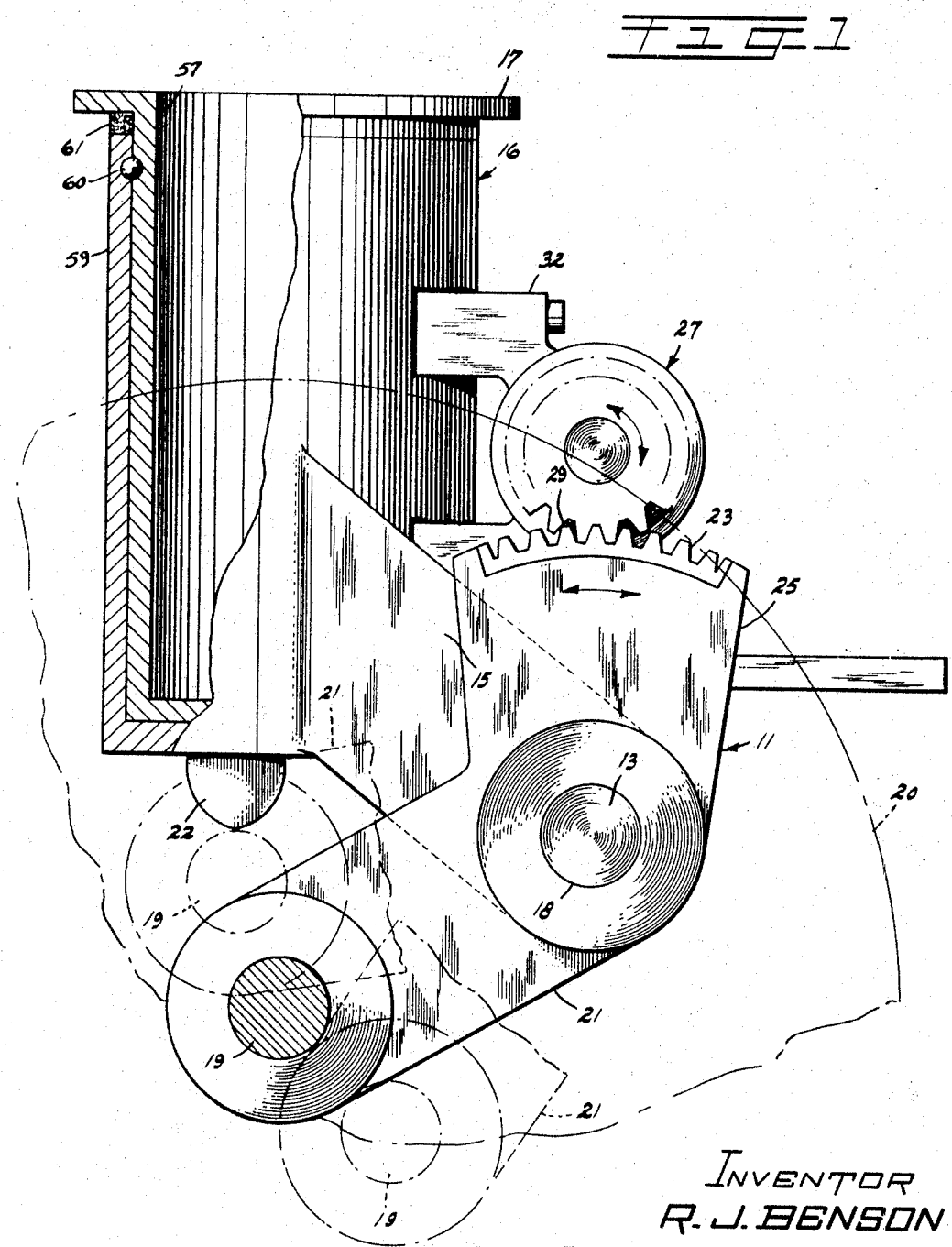
FIGURE 1 is a side elevation partially sectioned of a vehicle suspension system in accordance with this invention.

Referring now to the drawings, a rocker arm 11 is mounted on a main fulcrum 13 which serves as a support shaft for the rocker arm 11. The main fulcrum 13 is mounted rigidly on a rocker arm brace 15 which in turn is fixedly secured to a steering knuckle assembly 16. The knuckle assembly 16 is secured to a vehicle (not shown) by a mounting plate 17. The operation of the knuckle assembly 16 will be described in greater detail hereinafter. Between the rocker arm 11 and the main fulcrum 13, a damping bearing 18, preferably of the friction type, is utilized. The damping bearing 18 serves to upset natural spring frequencies and thus preclude damage from harmonic frequency.

At the lower end of the rocker arm 11 is a wheel spindle 19 about which a wheel 20 rotates. The spindle or lower portion 21 of the rocker arm 11 which extends from the spindle 19 to the main fulcrum 13 is inclined at an acute angle to the horizontal so that a load applied to the system will cause the spindle portion 21 of the rocker arm to rotate upward around the main fulcrum 13 toward an up-stop 22 thereby decreasing the size of the acute angle with the horizontal.

Since the main fulcrum 13 always remains fixed in relation to its vertical distance from the vehicle and also stays parallel with its predetermined plane, the wheel 20 does not tilt during its movements from load changes or bumps. The main fulcrum 13 also permits simplified steering equipment as the steering equipment does not have to change its distance from the vehicle. This same feature permits ready installation of accessory equipment and attachments.

At the end of the rocker arm 11 opposite from the spindle 19 is a gear quadrant 23. A gear or upper portion 25 of the rocker arm 11 from the support shaft 13 to the rocker gear 23 is preferably situated substantially vertically upward but other positions are possible in accordance with this invention.

The rocker arm 11 operates a spring assembly 27 by the meshing of the gear quadrant 23 and a sprocket gear 29. The spring assembly 27 is enclosed within a housing 31. The housing 31 is mounted on the knuckle assembly 16 by means of tabs 32. In this way the housing 31 and the main fulcrum 13 maintain a constant spacing in relation to the vehicle. At the end of the housing 31 (FIG. 5) adjacent the sprocket gear 29 is a thrust bearing 33. At the opposite end, the housing 31 has a thread 35 into which a plug 37 is screwed. The plug 37 actually forms a part of the housing 31. The end of the plug 37 has a wrench grip 39 for screwing the plug 37 in and out. Substantially in the center of the plug 37 is an opening 41. About the inside of the opening 41 is a radial bearing 43.

Connected to the gear 29 is a ballscrew shaft 44 which passes through the housing 31 and is mounted on the thrust bearing 33 and the radial bearing 43. The ballscrew shaft 44 includes a ballscrew portion 45. Fitted within the housing 31 and having an opening with a ballrace 46 extending through it, is a ballnut 47. The ballnut 47 is mounted on the shaft 44 with the ballrace 46 mating with the ballscrew shaft 44. The operation of the shaft 45 and the ballnut 47 is practically frictionless as the ballrace 46 includes recirculating ball bearings 46a which serve as the engagement medium between the ballrace 46 of the ballnut 47 and the ballscrew 45 of the shaft 44. Located in the interior of the housing 31 is a housing keyway 48. In sliding engagement with a ballnut keyway 49 in the ballnut 47 is a key 51 mounted in the housing keyway 48. The key 51 serves as a means to prevent rotation of the ballnut 47 while permitting linear movement of the ballnut 47 along the shaft 44.

One of the advantages of this invention, namely near frictionless operation, is achieved by the ballrace 46 with its recirculating ball bearings mating with the ballscrew portion 45. However, other advantages of this invention may be achieved by using a nut having any suitable thread means in place of the ballnut 47. The thread means, of course, would have to engage with screw means in the shaft 44 in place of the ballscrew portion 45.

Between the ballnut 47 and the plug 37 is a spring 53. When sufficient friction is maintained between the ballnut 47 and the spring 53, it may be possible to eliminate the keyways 48, 49 and the key 51. The extent of preload compression of the spring 53 is controlled by the position of the plug 37. Indicator marks 55 on the housing 31 adjacent the plug 37 may be used to show the extent of load placed on the spring 53. Since the plug 37 can be readily removed, the spring rate of the spring 53 can be changed by physically replacing the spring 53. Furthermore, if a support is placed under the vehicle and the plug 37 backed out and the spring 53 relieved of load, the wheel 20 can be readily lifted from the ground, as for example for repair purposes. Tightening and loosening of the plug 37 can be used to raise and lower wheels, as for example, when the vehicle passes over a sharp ramp peak.

By changing the lead of the ballscrew 45 on the shaft 44 and of the mating ballrace 46 of the ballnut 47, the effective spring rate of the system is also changed since the degree of spring utilization has been altered. However, the available amplitude of deflection of the wheel spindle 19 remains unchanged. Similarly, by the selection of the rocker arm 11 and the sprocket gear 29, the effective spring rate of the system can be altered as well as the total amplitude of deflection of the wheel spindle 19.

The spring assembly 27 is completely sealed so that lubricants are retained within the spring assembly 27 and dirt and other airborne matter are precluded from entry. Between the shaft 44 and the opening 41 of the plug 37 is a seal 52 which is also adjacent the radial bearing 43. On the opposite side of the radial bearing 43 is a bearing retainer ring 54 which serves to keep the radial bearing 43 in place. Between the plug 37 and the spring 53 is a washer 56 which serves to assist the tightening and loosening of compression in the spring 53 by the plug 37. This washer 56 is free turning to reduce plug friction when adjusting the plug 37. At the opposite end of the spring assembly 27 adjacent the gear 29 is another seal 58.

The knuckle assembly 16 as best seen in FIGURE 1 is formed by two interacting cylindrical members, namely an inner cylinder 57 and an outer cylinder 59. Ball bearings 60 are located between the inner cylinder 57 and the outer cylinder 59 toward the upper end of the knuckle assembly 16. The interacting faces of the two cylinders 57, 59 are environmentally sealed by a seal 61 to retain lubricants while precluding the entrance of airborne matter.

As best seen in FIGURE 4, a steering sprocket 62 is secured to the outer cylinder 59 of the knuckle assembly 16. A chain drive 63 meshes with the steering sprocket 62 to rotate the entire system a complete revolution as indicated by the arrows. The arrangement shown in FIGURE 4 can readily be adapted to the use of two wheels (not shown) by integrating two spindles similar to the spindle 19 with a common axis thereby applying the load of both wheels to the rocker arm 11. However, the rotation of the steering assembly about a complete revoluton can be achieved with either one or multiple wheels.

When a jolt causes the wheel 20 to move upward, the rocker arm 11 pivots about the support shaft 13. The rocker gear 23 which meshes with the sprocket gear 29 causes the sprocket gear 29 to rotate thereby rotating the shaft 44. Rotation of the shaft 44 moves the ballnut 47 against the spring 53. The spring 53 which as stated is loaded by the position of the plug 37, absorbs and cushions the jolt returning the wheel 20 to its proper position. The direction of movement of the ballnut 47 is shown by directional arrows in FIGURE 5.

In the embodiment described above, the spring 53 in compression is shown as one resilient means. A spring in tension may also be used as a resilient means and other possible resilient means includes hydraulic means and pneumatic means.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A suspension system for mounting a wheel on a vehicle comprising:
   a rocker arm having a lower portion with a lower end and an upper portion with an upper end, said upper end including a gear quadrant;
   a main fulcrum, said rocker arm being pivotably mounted on said main fulcrum substantially between said lower portion and said upper portion, said main fulcrum being mounted on a vehicle;
   means for mounting a wheel on the lower portion of said rocker arm adjacent said lower end, said lower portion being inclined at an angle to the horizontal;
   a shaft having a screw means along at least a portion of its length rotatably mounted on the vehicle, said main fulcrum and said shaft being fixedly spaced from one another;
   a gear mounted on said shaft in a meshing relationship with said gear quadrant;
   a nut having an opening with a thread means therein mounted on said shaft, said thread means being in meshing relationship with said screw means to permit rotation of said shaft within said nut, said nut being forced to move linearly along said shaft as said shaft rotates; and
   a resilient means associated with said nut to resist the linear movement of said nut and rotation of the shaft and movement of the rocker arm.

2. A suspension system according to claim 1 further including means for adjusting the ability of the resilient means to resist the linear movement of said nut.

3. A suspension system for mounting a wheel on a vehicle comprising:
   a rocker arm having a lower portion with a lower end and an upper portion with an upper end, said upper end including a gear quadrant;

a main fulcrum, said rocker arm being pivotably mounted on said main fulcrum with said main fulcrum engaging said rocker arm substantially between said lower portion and said upper portion;

means for mounting a wheel on the lower portion of said rocker arm adjacent said lower end, said lower portion being inclined at an angle to the horizontal;

a shaft having a screw means along at least a portion of its length;

a housing with said shaft rotatably mounted therein;

a gear mounted on said shaft external of said housing and in a meshing relationship with said gear quadrant;

means for mounting said housing and said main fulcrum on a vehicle to maintain a constant spacing between the vehicle and both said housing and said main fulcrum;

a nut having an opening with a thread means therein mounted on said shaft, said thread means being in meshing relationship with said screw means;

means for preventing the rotation of said nut while permitting linear movement of said nut relative to said shaft as said shaft rotates; and a resilient means within said housing in contact with said nut loaded to resist the linear movement of said nut, said housing including means for adjusting the load of said resilient means.

4. A suspension system according to claim 3 wherein said resilient means within said housing to resist the linear movement of said nut is a spring means about said shaft within said housing.

5. A suspension system according to claim 4 wherein said means for adjusting the load of said resilient means includes a threaded plug in contact with said spring means.

6. A suspension system according to claim 3 wherein said means for mounting said housing and said main fulcrum is rotatable a full revolution in a substantially horizontal plane.

7. A suspension system according to claim 6 wherein said means for mounting rotatably includes an inner cylinder vertically mounted and secured at its upper end to the vehicle and an outer cylinder with a closed lower end rotatably mounted about the inner cylinder, a bearing means being located between the inner cylinder and the outer cylinder to retain the outer cylinder about the inner cylinder and receive the force of an offset load, said main fulcrum and said housing being rigidly secured to said outer cylinder.

8. A suspension system according to claim 3 wherein said housing includes a cylindrical container, a thrust bearing located at the end adjacent said gear, a plug threaded into the opposite end of said container, said plug containing a radial bearing, said shaft being rotatably mounted on said thrust bearing and said radial bearing.

9. A suspension system according to claim 3 wherein said means for preventing the rotation of said nut includes a key, the longitudinal axis of said key being substantially parallel to the longitudinal axis of said shaft both said housing and said nut including keyways to receive said key.

10. A suspension system for mounting a wheel on a vehicle comprising:

an inner cylinder mounted on a vehicle;

an outer cylinder rotatably mounted about the inner cylinder;

means to retain the outer cylinder about the inner cylinder and receive the force of an offset load;

a rocker arm having a lower portion with a lower end and an upper portion with an upper end, said upper end including a gear quadrant;

a main fulcrum, said rocker arm being pivotably mounted on said main fulcrum substantially between said lower portion and said upper portion;

means for mounting said main fulcrum on said outer cylinder;

means for mounting a wheel on the lower portion of said rocker arm adjacent said lower end, said lower portion being inclined at an angle to the horizontal;

a shaft having a ballscrew along at least a portion of its length;

a housing including a threaded plug, said shaft being rotatably mounted within said housing, said housing being mounted on said outer cylinder;

a gear mounted on said shaft external of said housing, and in a meshing relationship with said gear quadrant;

a ballnut having an opening with a ballrace therein mounted on said shaft, said ballrace including ball bearings and being in meshing relationship with said ballscrew;

means associated with said ballnut and said housing for preventing the rotation of said ballnut while permitting linear movement of said ballnut relative to said shaft as said shaft rotates; and a spring means mounted about said shaft within said housing in contact with said ballnut and said plug to resist the linear movement of said ballnut.

11. A suspension system for mounting a wheel on a vehicle comprising:

an inner cylinder vertically mounted at its upper end to a vehicle;

an outer cylinder with a closed lower end rotatably mounted about the inner cylinder;

means located between the inner cylinder and the outer cylinder to retain the outer cylinder about the inner cylinder and receive the force of an offset load;

a rocker arm having a lower portion with a lower end and an upper portion with an upper end, said upper end including a gear quadrant;

a main fulcrum, said rocker arm being pivotably mounted on said main fulcrum substantially between said lower portion and said upper portion;

means for mounting said main fulcrum on said outer cylinder;

means for mounting a wheel on the lower portion of said rocker arm adjacent said lower end, said lower portion being inclined at an angle to the horizontal;

a shaft having a ballscrew along at least a portion of its length;

a cylindrical housing including a thrust bearing at one end and a plug threaded into the opposite end, said plug containing a radial bearing, said shaft being rotatably mounted on said thrust bearing and said radial bearing, said cylindrical housing being mounted on said outer cylinder, said housing having a housing keyway therein;

a gear mounted on said shaft external of said cylindrical housing adjacent the end of said cylindrical housinw where said thrust bearing is located, said gear being in a meshing relationship with said gear quadrant;

a ballnut having an opening with a recirculating ballrace therein mounted on said shaft, said recirculating ballrace including ball bearings and being in meshing relationship with the ballscrew, said ballnut having a ballnut keyway aligned with said housing keyway;

a key mounted in said housing keyway and said ballnut keyway for preventing the rotation of said ballnut while permitting linear movement of sail ballnut relative to said shaft as said shaft rotates; and a spring means mounted about said shaft within said cylindrical housing in contact with said housing and said plug to resist the linear movement of said ballnut.

12. A suspension system for mounting a wheel on a vehicle comprising:

a rocker arm having a lower portion with a lower end and an upper portion with an upper end, said upper end including a gear quadrant;

a main fulcrum, said rocker arm being pivotably mounted on said main fulcrum substantially between said lower portion and said upper portion;

means for mounting a wheel on the lower portion of said rocker arm adjacent said lower end, said lower portion being inclined at an angle to the horizontal;

a shaft having a ballscrew along at least a portion of its length;

a housing with said shaft rotatably mounted therein;

a gear mounted on said shaft external of said housing and in a meshing relationship with said gear quadrant;

means for mounting said housing and said main fulcrum on a vehicle to maintain a constant spacing between said vehicle and both said housing and said main fulcrum;

a ballnut having an opening with a ballrace therein, said ballrace including ball bearings and being in meshing relationship with said ballscrew;

means for preventing the rotation of said ballnut while permitting linear movement of said ballnut relative to said shaft as said shaft rotates; and a spring means mounted about said shaft within said housing in contact with said ballnut and said housing and loaded to resist the linear movement of said ballnut, said housing including means for adjusting the load of said spring means.

13. A suspension system for mounting a wheel on a vehicle comprising:

a shaft having a screw means along at least a portion of its length;

means for rotatably mounting said shaft on a vehicle;

a pivotably mounted rocker arm including a gear quadrant, the wheel being mounted on the rocker arm;

a gear mounted on said shaft in a meshing relationship with said gear quadrant;

a nut having an opening with a threaded means therein mounted on said shaft, said thread means being in meshing relationship with said screw means to permit rotation of said shaft within said nut, said nut being forced to move linearly along said shaft as said shaft rotates;

a resilient means associated with said nut and loaded to resist the linear movement of said nut along said shaft and the rotation of the shaft and rocker arm; and external means for adjusting the load on the resilient means.

14. A suspension according to claim 13 wherein:

said screw means on said shaft includes a ballscrew; and said thread means within said nut includes a ballrace with ball bearings.

15. A suspension system for mounting a wheel on a vehicle comprising:

a shaft having a ballscrew along at least a portion of its length;

means for rotatably mounting said shaft on a vehicle;

means for mounting a wheel on the vehicle and to rotate said shaft as the wheel moves in relation to the vehicle;

a ballnut having an opening with a ballrace therein mounted on said shaft, said ballrace including ball bearings and being in meshing relationship with said ballscrew to permit rotation of said shaft within said ballnut, said ballnut being forced to move linearly along said shaft as said shaft rotates;

a resilient means associated with said ballnut and loaded to resist the linear movement of said nut along said shaft and the rotation of the shaft and movement of the said wheel; and external means for adjusting the load on the resilient means.

References Cited

UNITED STATES PATENTS 2,911,231  11/1959  Allison _____ 280—104
1,991,911  2/1935   Riley _____ 267—20

OTHER REFERENCES

Standard & Precision Ballscrews, Walter Kidde Pamphlet #A–50–15M–9–65–NP.

PHILIP GOODMAN, Primary Examiner

U.S. Cl. X.R.

267—20